(12) United States Patent
Ji et al.

(10) Patent No.: US 11,323,991 B2
(45) Date of Patent: May 3, 2022

(54) RESOURCE INDICATION METHOD, MOBILE TERMINAL AND BASE STATION

(71) Applicant: VIVO MOBILE COMMUNICATION CO., LTD., Chang'an Dongguan (CN)

(72) Inventors: Zichao Ji, Chang'an Dongguan (CN); Xiaodong Shen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 192 days.

(21) Appl. No.: 16/625,321

(22) PCT Filed: Jun. 20, 2018

(86) PCT No.: PCT/CN2018/091996
§ 371 (c)(1),
(2) Date: Dec. 20, 2019

(87) PCT Pub. No.: WO2018/233629
PCT Pub. Date: Dec. 27, 2018

(65) Prior Publication Data
US 2021/0360591 A1 Nov. 18, 2021

(30) Foreign Application Priority Data
Jun. 22, 2017 (CN) .......................... 201710482719.7

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1812* (2013.01); *H04L 5/0094* (2013.01); *H04W 74/0841* (2013.01)

(58) Field of Classification Search
CPC . H04W 52/325; H04W 52/146; H04W 52/34; H04W 72/0413; H04W 72/1273;
(Continued)

(56) References Cited

U.S. PATENT DOCUMENTS

2013/0034073 A1* 2/2013 Aiba ..................... H04L 1/1887
370/329
2015/0181579 A1 6/2015 Aiba et al.

FOREIGN PATENT DOCUMENTS

| CN | 103490864 A | 1/2014 |
| CN | 103517426 A | 1/2014 |

(Continued)

OTHER PUBLICATIONS

3rd Chinese Office Action for Chinese Application No. 201710482719. 7, dated Jan. 15, 2021 (dated Jan. 15, 2021)—9 pages (English translation—10 pages).

(Continued)

*Primary Examiner* — Dady Chery
(74) *Attorney, Agent, or Firm* — Culhane Meadows PLLC; Stephen J. Weed

(57) ABSTRACT

A resource indication method, a mobile terminal, and a base station are provided. The resource indication method applied to the mobile terminal includes acquiring indication information and a physical uplink control channel PUCCH configuration resource configured for the mobile terminal sent by a base station, wherein the indication information is configured to indicate position information, in the PUCCH configuration resource, of a PUCCH resource used by the mobile terminal.

16 Claims, 5 Drawing Sheets

(51) Int. Cl.
   *H04L 5/00*         (2006.01)
   *H04W 74/08*        (2009.01)
(58) Field of Classification Search
   CPC ............ H04W 72/042; H04W 74/0841; H04L
               1/0026; H04L 1/1671; H04L 1/1887;
            H04L 5/0007; H04L 5/001; H04L 5/0053;
               H04L 5/0055; H04L 1/1812; H04L
                                            5/0094
   See application file for complete search history.

(56)             References Cited

FOREIGN PATENT DOCUMENTS

| EP | 2538601 A2 | 12/2012 |
| EP | 3471488 A1 | 4/2019 |
| WO | 2016171748 A1 | 10/2016 |

OTHER PUBLICATIONS

Guangdong OPPO Mobile Telecom: "Time-domain resource allocation for NR," R1-1710165, 3GPP TSG RAN WG1 NR Ad-Hoc #2, Qingdao, P.R. China, Jun. 27, 2017, 8 pages.
Extended European Search Report for European Application No. 18821524.8, dated May 26, 2020 (dated May 26, 2020)—11 pages.
International Search Report and Written Opinion for International Application No. PCT/CN2018/091996, dated Jan. 2, 2020 (dated Jan. 2, 2020)—10 pages (English translation—9 pages).
4th Chinese Office Action for Chinese Application No. 201710482719.7, dated May 14, 2021 (dated May 14, 2021)—9 pages (English translation—10 pages).
Samsung: "DL/UL Frequency Resource Allocation," R1-1710718, 3GPP TSG RAN WG1 NR Ad-Hoc, Qingdao, P.R. China, Jun. 27, 2017, 7 pages.

* cited by examiner

RESOURCE INDICATION METHOD, MOBILE TERMINAL AND BASE STATION

CROSS-REFERENCE TO RELATED APPLICATION

This application is a U.S. national phase application of a PCT Application No. PCT/CN2018/091996 filed on Jun. 20, 2018, which claims priority to a Chinese Patent Application No. 201710482719.7 filed in China on Jun. 22, 2017, the disclosure of which is incorporated herein in its entirety by reference.

TECHNICAL FIELD

The present disclosure relates to a technical field of communication application, and more particularly, relates to a resource indication method, a mobile terminal, and a base station.

BACKGROUND

In a radio access technology such as a Long Term Evolution (LTE), a network side (a device such as a radio base station) needs to allocate 1 to 4 orthogonal frequency division multiplexing (OFDM) symbols in a downlink frequency band as a Physical Downlink Control Channel (PDCCH) of a cell. All User Equipments (UEs) within the cell share the PDCCH. Meanwhile, the network side needs to allocate a plurality of Physical Resource Blocks (PRBs) at upper and lower edges of a system bandwidth in an uplink frequency band as a Physical Uplink Control Channel (PUCCH) of the cell, and broadcasts the allocation to all UEs within the cell through a System Information Block (SIB). All UEs in the cell share and multiplex the PUCCH, and send a Scheduling Request (SR), a Channel State Information (CSI) or a Hybrid Automatic Retransmission request acknowledge (HARQ acknowledge) within the PUCCH.

Resources of the CSI (Channel State Indication) and the SR (Scheduling Request) are allocated semi-statically to each UE by the network side, and the HARQ acknowledge is dynamically allocated.

In a case that the network side schedules a UE through Downlink Control Information (DCI), a Control Channel Element index (CCE index) of the DCI determines a resource position of a PUCCH HARQ acknowledge for the UE.

Since the DCI of each UE and a CCE index corresponding to the DCI are unique, a resource of the PUCCH HARQ acknowledge allocated to each UE is also unique, and even if in a case of a Multi-User Multiple-Input Multiple-Output (MU-MIMO), uplink HARQ acknowledges for UEs do not conflict with each other.

A fifth generation (5G) New Radio (NR) system supports a maximum system bandwidth of 400 MHz, which is much larger than a maximum system bandwidth of 20 MHz in the LTE, so as to support a larger system and a larger user throughput. However, supporting such a large system bandwidth by the NR will be a huge challenge to implementation of a UE, which is disadvantageous to a low-cost implementation of a UE. Thus, the 5G NR system also supports a dynamic and flexible bandwidth allocation manner in which the system bandwidth is divided into multiple bandwidth parts (BWPs) so as to support access of a narrowband UE or a UE in an energy saving mode.

The 5G NR system supports configuring a plurality of downlink Control Resource Sets (CORESET) as PDCCHs, and each UE may be configured with only one or more of the PDCCHs. Therefore, the narrowband UE or the UE in the energy saving mode may monitor only a PDCCH on a certain BWP, and does not need to monitor a PDCCH on an entirety of a system bandwidth in the LTE. The 5G NR system also supports a variety of numerical configurations (Numerology). A subcarrier may have a variety of different subcarrier spacings. The UE needs to select a correct Numerology to send the PUCCH.

In order to acquire an uplink spatial diversity gain, PUCCH resources in the LTE are arranged at both sides of the system bandwidth. For a NR system, since the system supports a much larger system bandwidth (a maximum system bandwidth of 400 MHz) than that of the LTE, allocating the PUCCH resources at both sides of the system bandwidth is not only unnecessary, but also very unfavorable for the narrowband UE or the UE in the energy saving mode to transmit Uplink Control Information (UCI). If an uplink BWP of the UE is configured at both sides of the system bandwidth, it is necessary to hop a radio-frequency frequency point to the PUCCH every time the UCI is transmitted, which increases design complexity of the radio frequency and power consumption of the UE.

The NR supports configuring a plurality of PDCCHs, each of the PDCCH has its own independent CCE number. If HARQ acknowledges of DCIs of all PDCCHs in the NR are transmitted on a same PUCCH unique in the system, the different DCIs of the PDCCHs all have the same CCE index, which greatly increases a collision probability of the HARQ acknowledges between UEs. Meanwhile, the NR system supports a MU-MIMO in the control channel, that is, in the same PDCCH, DCIs of multiple UEs will also have the same CCE index, resulting in collision of HARQ acknowledges of multiple MU-MIMO UEs. Accordingly, a corresponding mechanism is required to select, for a UE, a correct PUCCH for transmitting uplink control information.

SUMMARY

Some embodiments of the present disclosure provide a resource indication method, a mobile terminal, and a base station.

In a first aspect, some embodiments of the present disclosure provide a resource indication method. The resource indication method is applied to a mobile terminal and includes acquiring indication information and a physical uplink control channel (PUCCH) configuration resource configured for the mobile terminal sent by a base station, wherein the indication information is configured to indicate position information, in the PUCCH configuration resource, of a PUCCH resource used by the mobile terminal.

In a second aspect, some embodiments of the present disclosure provide a resource indication method. The resource indication method is applied to a base station and includes: sending, to a mobile terminal, indication information and a physical uplink control channel (PUCCH) configuration resource configured for the mobile terminal, wherein the indication information is configured to indicate position information, in the PUCCH configuration resource, of a PUCCH resource used by the mobile terminal.

In a third aspect, some embodiments of the present disclosure provide a mobile terminal. The mobile terminal includes an acquisition module, configured to acquire indication information and a physical uplink control channel (PUCCH) configuration resource configured for the mobile terminal sent by a base station, wherein the indication information is configured to indicate position information, in the PUCCH configuration resource, of a PUCCH resource used by the mobile terminal.

In a fourth aspect, some embodiments of the present disclosure also provide a mobile terminal. The mobile terminal includes a storage, a processor, and a computer program stored on the storage and executable by the processor, wherein in a case that the computer program is executed by the processor, the processor implements steps of the resource indication method applied to the terminal side described above.

In a fifth aspect, some embodiments of the present disclosure also provide a computer readable storage medium. The computer readable storage medium includes a computer program stored on the computer-readable storage medium, wherein in a case that the computer program is executed by a processor, the processor implements steps of the resource indication method applied to the terminal side described above.

In a sixth aspect, some embodiments of the present disclosure further provide a base station. The base station includes a second sending module, configured to send, to a mobile terminal, indication information and a physical uplink control channel (PUCCH) configuration resource configured for the mobile terminal, wherein the indication information is configured to indicate position information, in the PUCCH configuration resource, of a PUCCH resource used by the mobile terminal.

In a seventh aspect, some embodiments of the present disclosure also provide a base station. The base station includes a storage, a processor, and a computer program stored on the storage and executable by the processor, wherein in a case that the computer program is executed by the processor, the processor implements steps of the resource indication method applied to the base station side described above.

In an eighth aspect, some embodiments of the present disclosure also provide a computer readable storage medium. The computer readable storage medium includes a computer program stored on the computer-readable storage medium, wherein in a case that the computer program is executed by a processor, the processor implements steps of the resource indication method applied to the base station side described above.

BRIEF DESCRIPTION OF THE DRAWINGS

In order to more clearly illustrate technical solutions of the embodiments of the present disclosure, drawings to be used in the description of the embodiments of the present disclosure will be briefly described below. It will be apparent that the drawings in the following description are merely some embodiments of the present disclosure, and for those of ordinary skills in the art, other drawings may be obtained from these drawings without paying creative labor.

DETAILED DESCRIPTION

The technical solutions in some embodiments of the present disclosure will be clearly and completely described below in conjunction with the accompanying drawings in some embodiments of the present disclosure, and it will be apparent that the described embodiments are only a part, rather than all, of the embodiments of the present disclosure. Based on the embodiments of the present disclosure, all other embodiments obtained by those of ordinary skills in the art without paying creative work are within the scope of the present disclosure.

The resource indication method, the mobile terminal, and the base station provided by the present disclosure may solve a problem of how to select an appropriate PUCCH resource from PUCCH configuration resources for transmitting uplink control information.

Figure 1:
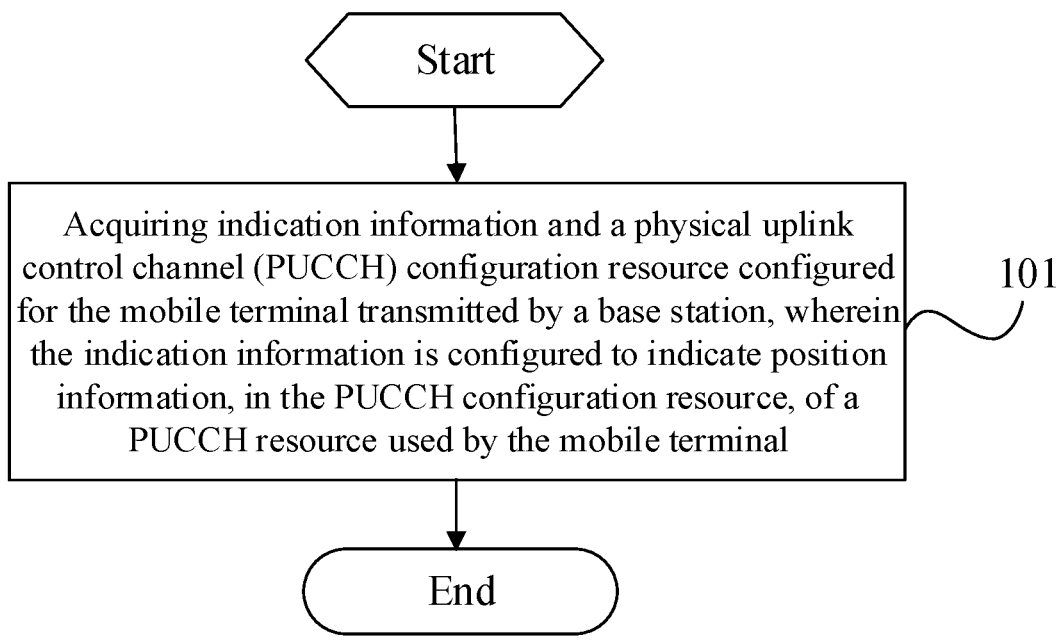
FIG. 1 is a flow chart of a resource indication method according to some embodiments of the present disclosure.

As shown in FIG. 1, some embodiments of the present disclosure provide a resource indication method that is applied to a mobile terminal and includes a step 101.

Step 101: acquiring indication information and a physical uplink control channel (PUCCH) configuration resource configured for the mobile terminal sent by a base station, wherein the indication information is configured to indicate position information, in the PUCCH configuration resource, of a PUCCH resource used by the mobile terminal.

Specifically, after the mobile terminal accesses a system, the mobile terminal acquires the indication information and the PUCCH configuration resource sent by the base station.

Further, the PUCCH configuration resource is configured by the base station through a higher layer signaling, for example, through a radio resource control (RRC) signaling, wherein the step 101 may specifically include: acquiring, through the higher layer signaling, the PUCCH configuration resource in a radio interface resource configured by the base station for the mobile terminal.

The radio interface resource further includes at least one physical downlink control channel (PDCCH) configuration resource, an association relationship between the PDCCH configuration resource and the PUCCH configuration resource, a bandwidth part for uplink transmission, and a bandwidth part for downlink transmission, an association relationship between the PUCCH configuration resource and the bandwidth part for the uplink transmission, and a sub-carrier spacing, a cyclic prefix, the number of symbols, and a period of the PUCCH configuration resource.

Further, the step of acquiring the indication information sent by the base station in the step 101 includes acquiring, through a higher layer signaling or downlink control information (DCI), the indication information sent by the base station.

The resource indication method in some embodiments of the present disclosure configures a radio interface resource for the mobile terminal through the higher layer signaling, and transmits the indication information to the mobile terminal through the higher layer signaling or the DCI, to indicate the position information of the PUCCH resource used by the mobile terminal in the PUCCH configuration resource.

Further, the resource indication method in some embodiments of the present disclosure further includes receiving minimum system information sent by the base station, wherein the minimum system information carries PDCCH resource configuration information and PUCCH resource configuration information corresponding to the PDCCH resource configuration information.

Specifically, the minimum system information periodically broadcast by the base station is received.

Here, the minimum system information further carries an association relationship between the PDCCH configuration resource and the PUCCH configuration resource, the bandwidth part for the uplink transmission, and the bandwidth part for the downlink transmission, the association relationship between the PUCCH configuration resource and the bandwidth part for the uplink transmission, the subcarrier spacing of the PUCCH configuration resource, the cyclic prefix, the symbol number, and the period.

Further, after receiving the minimum system information sent by the base station, the resource indication method further includes: in a case that the mobile terminal is configured with PUCCH resource in advance, transmitting the uplink control information according to the PUCCH resource configured in advance.

For example, in a case that a UE performs non-contention-based access during a handover procedure, the PUCCH resource configured in advanced by a handover command of a target cell may be used.

If the mobile terminal is not configured with a PUCCH resource in advance, the uplink control information is transmitted according to the PUCCH resource corresponding to the PUCCH resource configuration information carried in the minimum system information.

For example, in a contention-based initial access procedure, a HARQ acknowledge for a message-4 of an uplink initial access is sent by using the PUCCH.

The PUCCH resource configured in advance is specifically the PUCCH resource in the radio interface resource configured by the base station for the mobile terminal through the higher layer signaling.

Further, if the mobile terminal is not configured with a PUCCH resource in advance, the step of transmitting uplink control information according to the PUCCH resource corresponding to the PUCCH resource configuration information carried in the minimum system information includes: in a contention-based random access procedure, sending a hybrid automatic request retransmission response to the base station in a collision resolution procedure according to the PUCCH resource corresponding to the PUCCH resource configuration information carried in the minimum system information.

Specifically, the hybrid automatic request retransmission response may be sent to the base station in a step 4 of the collision resolution procedure.

A specific application flow in some embodiments of the present disclosure is described below.

1. A UE is synchronized to a NR system and performs an initial access procedure.
2. The UE reads the minimum system information, and acquires PDCCH configuration, uplink frequency point configuration, random access channel (RACH) configuration, and PUCCH configuration.
3. The UE sends a message Message-1 (a random access channel preamble (RACH preamble)) according to the RACH configuration.
4. The UE monitors the PDCCH, receives a message Message-2 (a random access response (RAR)), and transmits a message Message-3 according to the Message-2.
5. The UE monitors the PDCCH and receives the HARQ acknowledge for the Message-3.
6. The network side transmits a Message-4 to the UE, the Message-4 includes UE-specific PDCCH and PUCCH configurations.
7. The UE monitors the PDCCH, receives the Message-4 transmitted by the network side, and sends the HARQ acknowledge on a PUCCH configured by the minimum system information.
8. The UE configures a new PDCCH and a PUCCH according to the received Message-4.

In the resource indication method in some embodiments of the present disclosure, the base station encapsulates the PUCCH resource configuration in the minimum system information, and may also configure one or more UE-specific PUCCH resources for the UE through the higher layer signaling such as a RRC, and configure, through the higher layer signaling such as the RRC, the UE to specifically use which of the one or more PUCCH resources or dynamically indicate, through the DCI, the UE to use which of the one or more PUCCH resources; the UE selects to send an uplink HARQ acknowledge on a corresponding PUCCH resource according to a condition of whether the UE-specific PUCCH resource is configured or not.

Figure 2:
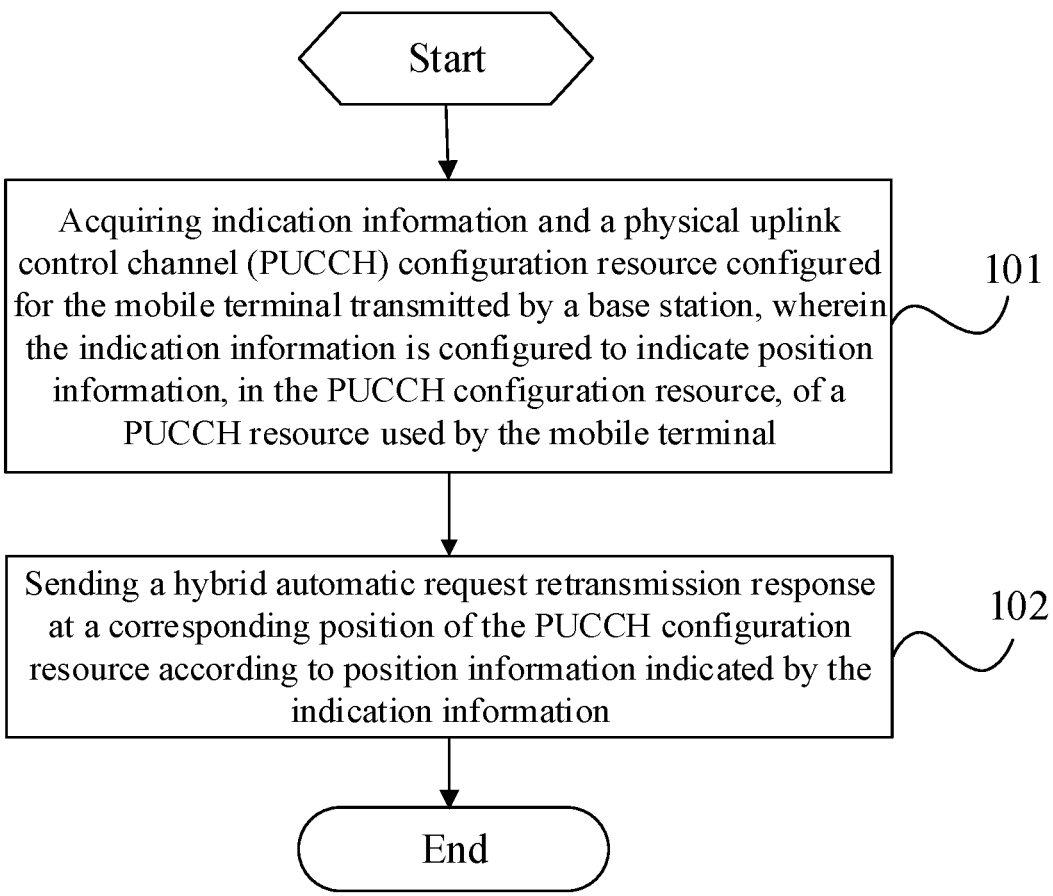
FIG. 2 is another flow chart of a resource indication method according to some embodiments of the present disclosure.

Further, as shown in FIG. 2, after the above step 101, the resource indication method further includes a step 102.

Step 102: sending a hybrid automatic request retransmission response at a corresponding position of the PUCCH configuration resource according to the position information indicated by the indication information.

The indication information includes at least one of the following: the association relationship between the PDCCH configuration resource and the PUCCH configuration resource, a control channel element index of downlink control information, resource offset indication information carried in the downlink control information, and a starting position of the PUCCH configuration resource.

Here, the mobile terminal sends, based on the indication information, the hybrid automatic request retransmission response to the base station at a position corresponding to the position information indicated by the indication information in the PUCCH configuration resource.

The implementation of the above step 102 will be described below in connection with specific application scenarios.

A First Application Scenario

The radio interface resource includes at least two PUCCH configuration resources and at least two PDCCH configuration resources, and the PUCCH configuration resources correspond to the PDCCH configuration resources in one-to-one correspondence manner.

In this case, the step 102 may specifically include sending the hybrid automatic request retransmission response to the base station according to a resource position, corresponding to a control channel element index of first downlink control information (DCI), in a first PUCCH configuration resource; wherein the first DCI is a DCI of a first PDCCH configuration resource, the first PUCCH configuration resource is a PUCCH configuration resource corresponding to the first PDCCH configuration resource, and the first PDCCH configuration resource is any one of at least two PDCCH configuration resources.

In the first application scenario, it is assumed that the network side allocates two PDCCH resources and two PUCCH resources to the UE. A PDCCH-1 corresponds to a starting position of a resource index in a PUCCH-1 resource, and a PDCCH-2 corresponds to a starting position of a resource index in a PUCCH-2 resource. The UE receives downlink DCI-1 in the PDCCH-1, and sends the HARQ acknowledge according to a resource position, corresponding to a CCE index of the DCI-1, in the PUCCH-1. The UE receives downlink DCI-2 in the PDCCH-2, and sends a HARQ acknowledge at a resource position, corresponding to a CCE index of the DCI-2, in the PUCCH-2.

A Second Application Scenario

The radio interface resource includes a PUCCH configuration resource and at least two PDCCH configuration resources, and each of the PDCCH configuration resources corresponds to a PUCCH resource subset in the PUCCH configuration resource. Here, each PUCCH resource subset corresponds to a starting position in the PUCCH configuration resource.

In this case, the step 102 may specifically include sending a hybrid automatic request retransmission response to the base station according to a resource position, corresponding to a control channel element index of a second DCI, in the first PUCCH resource subset; wherein the second DCI is a DCI of a second PDCCH configuration resource, the first PUCCH resource subset is a PUCCH resource subset corresponding to the second PDCCH configuration resource, the second PDCCH configuration resource is any one of the at least two PDCCH configuration resources.

In the second application scenario, it is assumed that the network side allocates two PDCCH resources and a PUCCH resource to the UE. Each PDCCH corresponds to a starting position of a resource index in the PUCCH resource. The PUCCH resource is divided in to a first PUCCH subset and a second PUCCH subset according to the starting position of the resource index in the PUCCH resource; the UE receives downlink DCI-1 in a PDCCH-1, and sends a HARQ acknowledge according to a resource position, corresponding to a CCE index of the DCI-1, in the first PUCCH subset.

The UE receives downlink DCI-2 in the PDCCH-2, and sends a HARQ acknowledge according to a resource position, corresponding to a CCE index of the DCI-2, in the second PUCCH subset.

Third Application Scenario

A PDCCH configuration resource included in the radio interface resource carries different pieces of downlink control information (DCI), and control channel element indices of the different pieces of DCI correspond to different PUCCH configuration resources.

In this case, the above step 102 may specifically include selecting a target DCI, configured for the mobile terminal, in the PDCCH configuration resource, and sending a hybrid automatic request retransmission response to the base station according to a resource position, corresponding to a control channel element index of the target DCI, in a target PUCCH configuration resource, wherein the target PUCCH configuration resource is a PUCCH configuration resource corresponding to the target DCI.

In this third application scenario, it is assumed that the network side configures the same PDCCH resource and different PUCCH resources for a UE-1 and a UE-2. The UE-1 is configured with a PUCCH-1, and the UE-2 is configured with a PUCCH-2. The network side transmits a DCI-1 and a DCI-2 to the UE-1 and the UE-2 respectively on the same PDCCH resource by using the MU-MIMO. A CCE index of the DCI-1 and a CCE index of the DCI-2 are the same.

The UE-1 sends a HARQ acknowledge on the PUCCH-1 according to the CCE index of the DCI-1, and the UE-2 sends a HARQ acknowledge on the PUCCH-2 according to the CCE index of the DCI-2. The two HARQ acknowledges use different resource positions to avoid a conflict between the resources.

A Fourth Application Scenario

A DCI of the PDCCH configuration resource included in the radio interface resource carries resource offset indication information.

In this case, the step 102 may specifically include: according to a control channel element index of the DCI of the PDCCH configuration resource and the resource offset indication information carried by the DCI, selecting a PUCCH configuration resource from a plurality of PUCCH configuration resources included in the radio interface resource; and according to a subcarrier spacing, a cyclic prefix, the number of symbols, and a period of the PUCCH configuration resource and a bandwidth part for uplink transmission associated with the PUCCH, selecting a resource position, for sending the hybrid automatic request retransmission response to the base station, in the selected PUCCH configuration resource.

In the fourth application scenario, it is assumed that the network side allocates two PUCCH resources and the resource offset indication information to the UE, and the network side transmits downlink DCI to the UE, wherein the DCI carries the resource offset indication information. The UE receives the downlink DCI in the PDCCH, selects one of the configured PUCCH resources according to a CCE index of the DCI and the resource offset indication information in the DCI, and according to configuration information such as a BWP, a subcarrier spacing and a CP associated with the PUCCH resource, selects a corresponding resource position in the PUCCH to transmit a HARQ acknowledge.

A Fifth Application Scenario

The radio interface resource includes one or at least two PDCCH configuration resources and at least two PUCCH configuration resources, and a DCI of each of the one or at least two PDCCH configuration resources carries the resource offset indication information and slot information of the PUCCH configuration resources.

In this case, the step 102 may specifically include: according to the slot information, the resource offset indication information and periods of the PUCCH resources carried by the DCI of the PDCCH configuration resource, selecting a PUCCH configuration resource in the radio interface resource; and according to a subcarrier spacing, a cyclic prefix, the number of symbols and a period of the PUCCH resource, and a bandwidth part for uplink transmission associated with a PUCCH, selecting a resource position, for sending a hybrid automatic request retransmission response to the base station, in the selected PUCCH configuration resource.

In the fifth application scenario, it is assumed that the network side allocates two PUCCH resources to the UE, wherein one of the two PUCCH resources is a long PUCCH having a length of 7 symbols, and the other of the two PUCCH resources is a short PUCCH having a length of a symbol, and periods of the two PUCCHs are different. The network side transmits downlink DCI to the UE, wherein the DCI indicates information such as a slot timing of a corresponding uplink HARQ acknowledge, the resource offset indication, and the like. The UE receives the downlink DCI in the PDCCH, selects a corresponding long PUCCH or short PUCCH resource according to the HARQ acknowledge timing and the resource offset indication indicated by the DCI and periods of the PUCCH resources, and sends an uplink HARQ acknowledge according to configuration of the PUCCH resource.

A Sixth Application Scenario

The radio interface resource includes one or at least two PDCCH configuration resources and at least two PUCCH configuration resources, and different ones of the PUCCH configuration resources correspond to different bandwidth parts, and a DCI of each of the one or at least two PDCCH configuration resources carries resource offset indication information, slot information of the PUCCH configuration resources, and bandwidth parts corresponding to the PUCCH configuration resources.

In this case, the step 102 may specifically include: according to the resource offset indication information, the slot information of the PUCCH configuration resources and the bandwidth parts corresponding to the PUCCH configuration resources carried by the DCI, selecting a PUCCH configuration resource on a BWP; and according to a subcarrier spacing, a cyclic prefix, the number of symbols, and a period of the PUCCH resource and a bandwidth part for uplink transmission associated with a PUCCH, selecting a resource position, for sending a hybrid automatic request retransmission response to the base station, in the selected PUCCH configuration resource.

In this sixth application scenario, it is assumed that the network side allocates two PUCCH resources to the UE, wherein one of the two PUCCH resources is at a BWP-1 and the other of the two PUCCH resources is at a BWP-2. The network side transmits downlink DCI to the UE, and the DCI indicates information such as timing of a corresponding uplink HARQ acknowledge, a resource offset indication, and the like. The UE receives the downlink DCI in the PDCCH, selects a PUCCH resource at a corresponding BWP according to the information indicated by the DCI, and sends an uplink HARQ acknowledge according to configuration of the PUCCH resource.

The resource indication method in some embodiments of the present disclosure optimizes an allocation scheme of PUCCH resources in a large-bandwidth scene, improves resource utilization, supports response feedbacks of multiple PDCCHs, and solves a resource conflict problem in a multi-user space division multiplexing.

Figure 3:
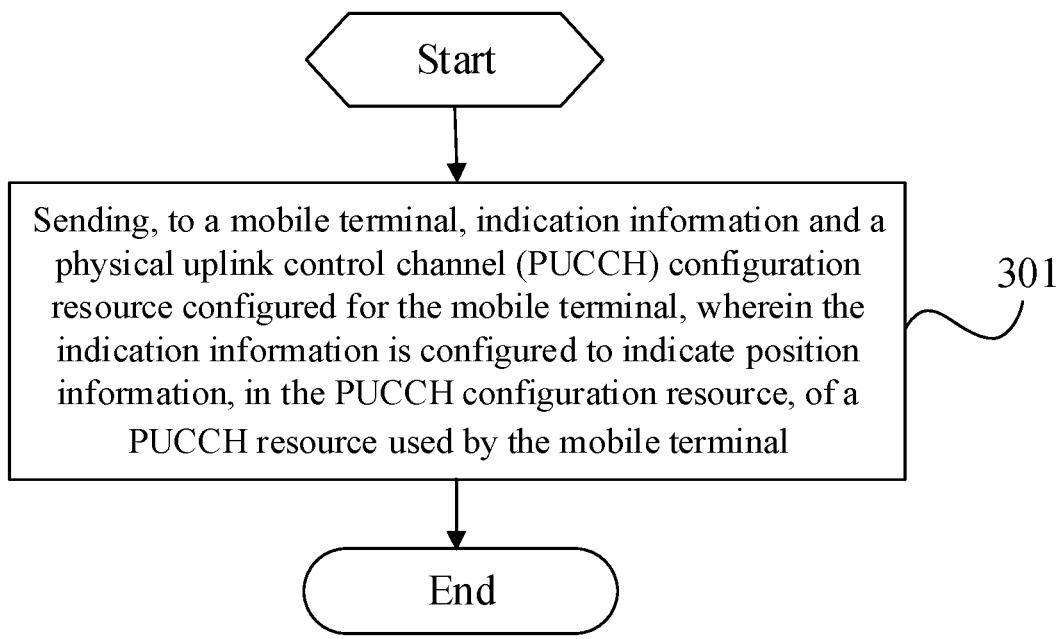
FIG. 3 is yet another flowchart of a resource indication method according to some embodiments of the present disclosure.

As shown in FIG. 3, some embodiments of the present disclosure also provide a resource indication method that is applied to a base station and includes a step 301.

Step 301: sending, to a mobile terminal, indication information and a physical uplink control channel (PUCCH) configuration resource configured for the mobile terminal, wherein the indication information is configured to indicate position information, in the PUCCH configuration resource, of a PUCCH resource used by the mobile terminal.

Further, the above step 301 includes transmitting a radio interface resource configured for the mobile terminal to the mobile terminal through a higher layer signaling, wherein the radio interface resource includes the PUCCH configuration resource.

The radio interface resource further includes at least one physical downlink control channel (PDCCH) configuration resource, an association relationship between the PDCCH configuration resource and the PUCCH configuration resource, a bandwidth part for uplink transmission, a bandwidth part for downlink transmission, an association relationship between the PUCCH resource and the bandwidth part for the uplink transmission, and a subcarrier spacing, a cyclic prefix, the number of symbols, and a period of the PUCCH configuration resource.

Further, the radio interface resources may be acquired by configuring a PDCCH configuration resource and a PUCCH configuration resource in a bandwidth part for the mobile terminal according to information of the mobile terminal, wherein the information of the mobile terminal includes at least one of capability information of the mobile terminal and service transmission information of the mobile terminal.

Figure 4:
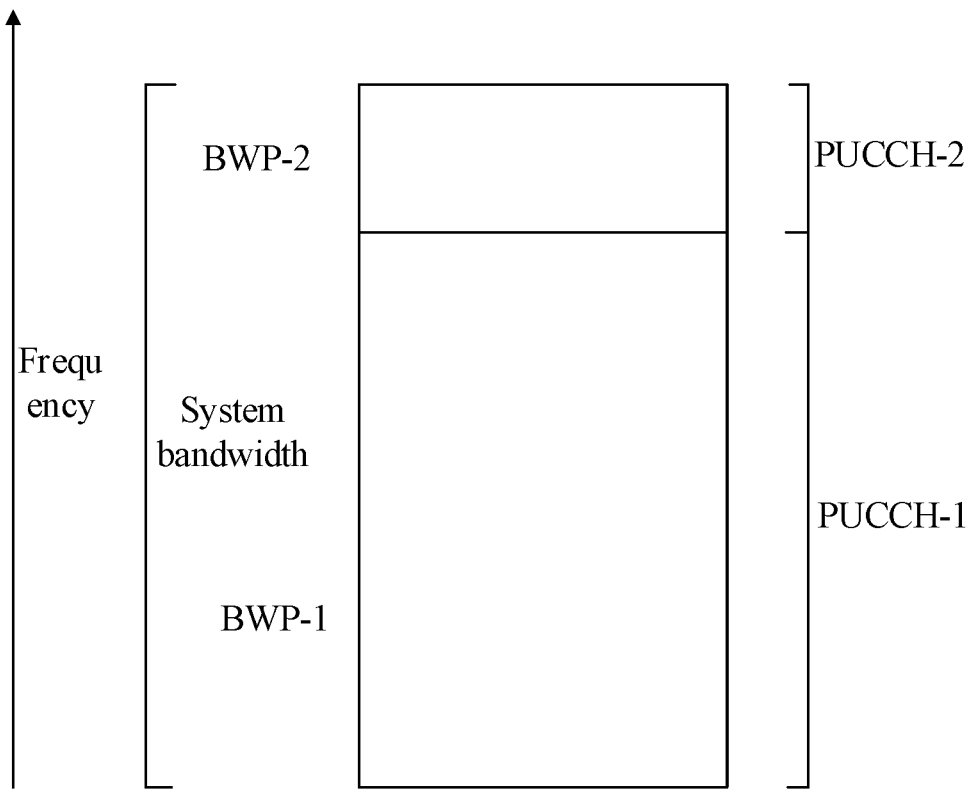
FIG. 4 is a schematic diagram of configuring PUCCH resources at different BWPs in the resource indication method according to some embodiments of the present disclosure.

As shown in FIG. 4, the network side deploys a broadband network system having a bandwidth of 100 MHz on a carrier frequency F 1, and divides the bandwidth of 100 MHz into two BWPs, wherein a BWP-1 is a large bandwidth and a BWP-2 is a small bandwidth. After the UE accesses a network, the UE reports a capability of the UE, indicating that the UE supports an entire frequency band. The network side configures a PDCCH resource in the large bandwidth BWP-1 and a corresponding PUCCH resource for the UE. The UE implements the configuration and performs a normal service, and transmits a PUCCH according to configurations such as a BWP, a subcarrier spacing, a CP and the like associated with the PUCCH. The network side configures the UE with a PDCCH resource in the small bandwidth BWP-2 and a corresponding PUCCH resource according to information such as a current signal quality, a traffic data amount or the like of the terminal. The UE adjusts a radio frequency to perform a service only in the BWP-2 to reduce energy consumption.

Further, in some embodiments of the present disclosure, the step of sending, to the mobile terminal, the indication information and the physical uplink control channel (PUCCH) configuration resource configured for the mobile terminal includes: through a higher layer signaling or downlink control information (DCI), sending the indication information to the mobile terminal.

In a case that the indication information is DCI, at least one of resource offset indication information, slot information of a PUCCH configuration resource and a bandwidth part corresponding to a PUCCH resource is carried in the DCI.

Further, the resource indication method in some embodiments of the present disclosure further includes sending minimum system information to the mobile terminal, wherein the minimum system information carries PDCCH resource configuration information and PUCCH resource configuration information corresponding to the PDCCH resource configuration information.

Here, the minimum system information further carries an association relationship between the PDCCH configuration resource and the PUCCH configuration resource, a bandwidth part for uplink transmission, and a bandwidth part for downlink transmission, an association relationship between the PUCCH configuration resource and the bandwidth part for uplink transmission, and a subcarrier spacing, a cyclic prefix, the number of symbols, and a period of the PUCCH configuration resource.

Further, after sending the indication information and the physical uplink control channel (PUCCH) configuration resource configured for the mobile terminal to the mobile terminal, the resource indication method of some embodiments of the present disclosure further includes: detecting, on a PUCCH configuration resource configured in advance, uplink control information transmitted by the mobile terminal, wherein the PUCCH configuration resource configured in advance includes a PUCCH configuration resource configured by the base station for the mobile terminal through a higher layer signaling, or a PUCCH resource corresponding to PUCCH resource configuration information carried by the minimum system information.

The resource indication method of some embodiments of the present disclosure optimizes the allocation scheme of PUCCH resources in a large bandwidth scene, improves resource utilization, supports response feedbacks of multiple PDCCHs, and solves a resource conflict problem in the multi-user space division multiplexing.

Figure 5:
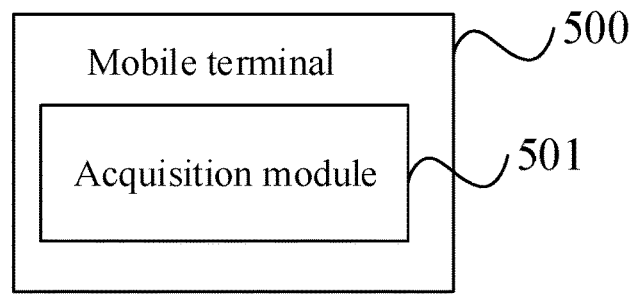
FIG. 5 is a schematic diagram of modules in a mobile terminal according to some embodiments of the present disclosure.

As shown in FIG. 5, some embodiments of the present disclosure also provide a mobile terminal 500. The mobile terminal 500 includes an acquisition module 501, configured to acquire indication information and a physical uplink control channel (PUCCH) configuration resource configured for the mobile terminal sent by a base station, wherein the indication information is configured to indicate position information, in the PUCCH configuration resource, of a PUCCH resource used by the mobile terminal.

In the mobile terminal according to some embodiments of the present disclosure, the acquisition module 501 is configured to acquire, through a higher layer signaling, the PUCCH configuration resource in a radio interface resource configured by the base station for the mobile terminal.

In the mobile terminal according to some embodiments of the present disclosure, the radio interface resource further includes at least one physical downlink control channel (PDCCH) configuration resource, an association relationship between the PDCCH configuration resource and the PUCCH configuration resource, a bandwidth part for uplink transmission, and a bandwidth part for downlink transmission, an association relationship between the PUCCH configuration resource and the bandwidth part for the uplink transmission, and a subcarrier spacing, a cyclic prefix, the number of symbols, and a period of the PUCCH configuration resource.

In the mobile terminal according to some embodiments of the present disclosure, the acquisition module 501 is configured to acquire, through a higher layer signaling or downlink control information (DCI), the indication information sent by the base station.

Figure 6:
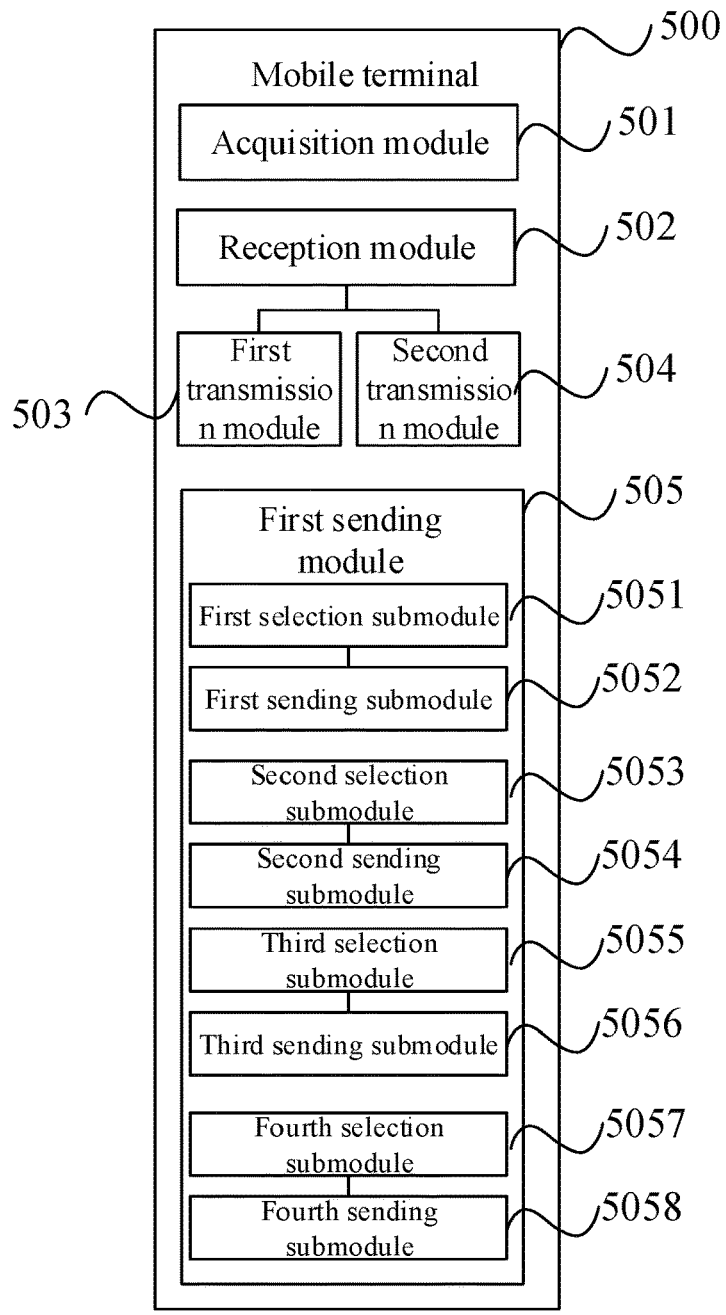
FIG. 6 is another schematic diagram of modules in a mobile terminal according to some embodiments of the present disclosure.

As shown in FIG. 6, the mobile terminal 500 of some embodiments of the present disclosure further includes a reception module 502, configured to receive minimum system information sent by the base station, wherein the minimum system information carries PDCCH resource configuration information and PUCCH resource configuration information corresponding to the PDCCH resource configuration information.

The mobile terminal 500 according to some embodiments of the present disclosure further includes a first transmission module 503 and a second transmission module 504. The first transmission module 503 is configured to: in a case that the mobile terminal is configured with a PUCCH resource in advance, transmit uplink control information according to the PUCCH resource configured in advance. The second transmission module 504 is configured to: in a case that the mobile terminal is not configured with a PUCCH resource in advance, transmit the uplink control information according to a PUCCH resource corresponding to the PUCCH resource configuration information carried in the minimum system information.

In the mobile terminal according to some embodiments of the present disclosure, the second transmission module 504 is configured to: in a contention-based random access procedure, send a hybrid automatic request retransmission response to the base station in a collision resolution procedure according to a PUCCH resource corresponding to the PUCCH resource configuration information carried in the minimum system information.

The mobile terminal 500 of some embodiments of the present disclosure further includes a first sending module 505, configured to send a hybrid automatic request retransmission response at a corresponding position of the PUCCH configuration resource according to position information indicated by the indication information.

In the mobile terminal of some embodiments of the present disclosure, the indication information includes at least one of: an association relationship between a PDCCH configuration resource and a PUCCH configuration resource, a control channel element index of downlink control information, resource offset indication information carried in the downlink control information, and a starting position of the PUCCH configuration resource.

In the mobile terminal of some embodiments of the present disclosure, the radio interface resource includes at least two PUCCH configuration resources and at least two PDCCH configuration resources, and the PUCCH configuration resources correspond to the PDCCH configuration resources in one-to-one correspondence manner. The first sending module 505 is configured to send the hybrid automatic request retransmission response to the base station according to a resource position, corresponding to a control channel element index of first downlink control information (DCI), in a first PUCCH configuration resource; wherein the first DCI is a DCI of a first PDCCH configuration resource, the first PUCCH configuration resource is a PUCCH configuration resource corresponding to the first PDCCH configuration resource, and the first PDCCH configuration resource is any one of at least two PDCCH configuration resources.

In the mobile terminal of some embodiments of the present disclosure, the radio interface resource includes a PUCCH configuration resource and at least two PDCCH configuration resources, and each of the PDCCH configuration resources corresponds to a PUCCH resource subset in the PUCCH configuration resource. The first sending module 505 is configured to: send a hybrid automatic request retransmission response to the base station according to a resource position, corresponding to a control channel element index of a second DCI, in a first PUCCH resource subset; wherein the second DCI is a DCI of a second PDCCH configuration resource, the first PUCCH resource subset is a PUCCH resource subset corresponding to the second PDCCH configuration resource, the second PDCCH configuration resource is any one of the at least two PDCCH configuration resources.

In the mobile terminal according to some embodiments of the present disclosure, a PDCCH configuration resource included in the radio interface resource carries different pieces of downlink control information (DCI), and control channel element indices of the different pieces of DCI correspond to different PUCCH configuration resources. The first sending module 505 includes a first selection submodule 5051 and a first sending submodule 5052. The first selection submodule 5051 is configured to select a target DCI, configured for the mobile terminal, in the PDCCH configuration resource. The first sending submodule 5052 is configured to send a hybrid automatic request retransmission response to the base station according to a resource position, corresponding to a control channel element index of the target DCI, in a target PUCCH configuration resource, wherein the target PUCCH configuration resource is a PUCCH configuration resource corresponding to the target DCI.

In the mobile terminal according to some embodiments of the present disclosure, a DCI of a PDCCH configuration resource included in the radio interface resource carries resource offset indication information. The first sending module 505 includes a second selection submodule 5053 and a second sending submodule 5054. The second selection submodule 5053 is configured to, according to a control channel element index of the DCI of the PDCCH configuration resource and the resource offset indication information carried by the DCI, select a PUCCH configuration resource from a plurality of PUCCH configuration resources included in the radio interface resource. The second sending submodule 5054 is configured to, according to a subcarrier spacing, a cyclic prefix, the number of symbols, and a period of the PUCCH configuration resource and a bandwidth part for uplink transmission associated with the PUCCH, select a resource position, for sending the hybrid automatic request retransmission response to the base station, in the selected PUCCH configuration resource.

In the mobile terminal of some embodiments of the present disclosure, the radio interface resource includes one or at least two PDCCH configuration resources and at least two PUCCH configuration resources, and a DCI of each of the one or at least two PDCCH configuration resources carries resource offset indication information and slot information of the PUCCH configuration resources. The first sending module 505 includes a third selection submodule 5055 and a third sending submodule 5056. The third selection submodule 5055 is configured to: according to the slot information, the resource offset indication information and periods of the PUCCH resources carried by the DCI of the PDCCH configuration resources, select a PUCCH configuration resource in the radio interface resource. The third sending submodule 5056 is configured to, according to a subcarrier spacing, a cyclic prefix, the number of symbols and a period of a PUCCH resource and a bandwidth part for uplink transmission associated with the PUCCH, select a resource position, for sending a hybrid automatic request retransmission response to the base station, in the selected PUCCH configuration resource.

In the mobile terminal of some embodiments of the present disclosure, the radio interface resource includes one or at least two PDCCH configuration resources and at least two PUCCH configuration resources, and different ones of the PUCCH configuration resources correspond to different bandwidth parts, and a DCI of each of the one or at least two PDCCH configuration resources carries resource offset indication information, slot information of the PUCCH configuration resources, and bandwidth parts corresponding to the PUCCH configuration resources. The first sending module 505 includes a fourth selection submodule 5057 and a fourth sending submodule 5058. The fourth selection submodule 5057 is configured to, according to the resource offset indication information, the slot information of the PUCCH configuration resources and the bandwidth parts corresponding to the PUCCH configuration resources carried by the DCI, select a PUCCH configuration resource on a BWP. The fourth sending submodule 5058 is configured to, according to a subcarrier spacing, a cyclic prefix, the number of symbols, and a period of a PUCCH resource and a bandwidth part for uplink transmission associated with a PUCCH, select a resource position, for sending a hybrid automatic request retransmission response to the base station, in the selected PUCCH configuration resource.

It should be noted that the mobile terminal is a terminal corresponding to the above-described method embodiments applied to a terminal side, all implementation in the above-described method embodiments applied to the terminal side are applicable to the embodiment of the mobile terminal, and the same technical effect may be achieved.

The mobile terminal of some embodiments of the present disclosure acquires indication information and a physical uplink control channel (PUCCH) configuration resource configured for the mobile terminal sent by a base station, and from the indication information, the mobile terminal may be informed of position information, in the PUCCH configuration resource, of a PUCCH resource used by the mobile terminal, and further select, based on the position information, a corresponding PUCCH resource for transmitting uplink control information, thereby increasing a resource utilization rate; and a resource conflict problem in a multi-user space division multiplexing may be addressed.

Some embodiments of the present disclosure also provide a mobile terminal. The mobile terminal includes a storage, a processor, and a computer program stored on the storage and executable by the processor. In a case that the computer program is executed by the processor, the processor implements the steps of the resource indication method applied to the terminal side, and the same technical effect may be achieved. In order to avoid repetition, the detailed description thereof is omitted here.

Some embodiments of the present disclosure also provide a computer readable storage medium having a computer program stored thereon. In a case that the computer program is executed by a processor, the processor implements the steps of the resource indication method applied to the terminal side, and the same technical effect may be achieved. In order to avoid repetition, the detailed description thereof is omitted here. The computer readable storage medium may be a volatile storage medium or a non-volatile storage medium, such as a Read-Only Memory (ROM), a Random Access Memory (RAM), a magnetic disk, an optical disk, or the like.

Figure 7:
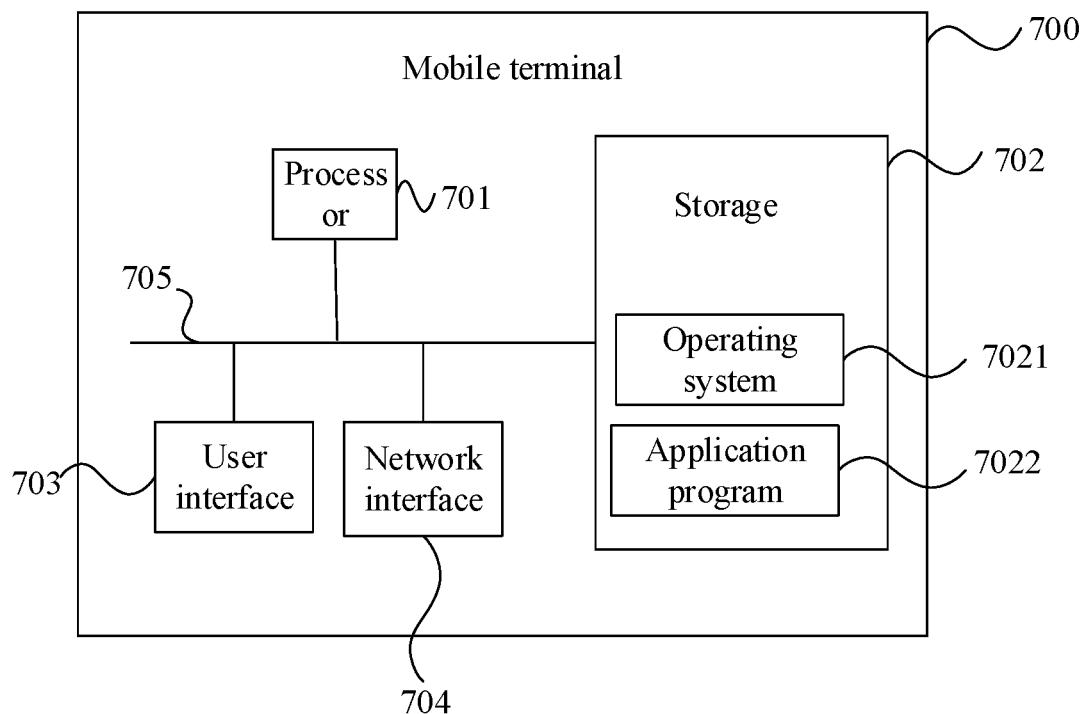
FIG. 7 is a structural block diagram of a mobile terminal according to some embodiments of the present disclosure.

As shown in FIG. 7, some embodiments of the present disclosure also provide a mobile terminal, and the mobile terminal 700 shown in FIG. 7 includes at least one processor 701, a storage 702, at least one network interface 704, and other user interfaces 703. The various components in the mobile terminal 700 are coupled together by a bus system 705. It will be appreciated that the bus system 705 is configured to enable connection communication among these components. The bus system 705 includes a data bus, a power bus, a control bus, and a status signal bus. However, for clarity of illustration, various buses are designated as the bus system 705 in FIG. 7.

The user interface 703 may include a display, a keyboard, or a pointing device (e.g., a mouse, a trackball, a touch pad, or a touch screen, etc.).

It may be understood that the storage 702 in some embodiments of the present disclosure may be a volatile storage or a non-volatile storage, or may include both the volatile storage and the non-volatile storage. The non-volatile storage may be a Read-Only Memory (ROM), a Programmable ROM (PROM), an Erasable PROM (EPROM), an Electrically EPROM (EEPROM) or a flash memory. The volatile storage may be a Random Access Memory (RAM), which serves as an external cache. By way of example, but not limitation, many forms of RAMs may be used, such as a static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 702 in the systems and methods described herein is intended to include, but is not limited to, these and any other suitable types of memory.

In some embodiments, the storage 702 stores following elements, executable modules or data structures, or a subset thereof, or an extended set thereof: an operating system 7021 and an application program 7022.

The operating system 7021 includes various system programs, such as a framework layer, a core library layer, and a driver layer, for implementing various basic services and processing hardware-based tasks. The application program 7022 includes various application programs such as a Media Player, a Browser, and the like, for implementing various application services. Programs implementing the methods of some embodiments of the present disclosure may be included in the application program 7022.

In the embodiments of the present disclosure, by invoking a computer program or instruction stored in the storage 702, specifically by invoking a computer program or instruction stored in application program 7022, the processor 701 implements the following steps in a case that the computer program is executed by the processor 701: acquiring indication information and a physical uplink control channel (PUCCH) configuration resource configured for the mobile terminal sent by a base station, wherein the indication information is configured to indicate position information, in the PUCCH configuration resource, of a PUCCH resource used by the mobile terminal.

Optionally, in a case that the computer program is executed by the processor 701, the processor 701 implements a following step: acquiring, through a higher layer signaling, the PUCCH configuration resource in a radio interface resource configured by the base station for the mobile terminal.

Optionally, the radio interface resource further includes at least one physical downlink control channel (PDCCH) configuration resource, an association relationship between the PDCCH configuration resource and the PUCCH configuration resource, a bandwidth part for uplink transmission, and a bandwidth part for downlink transmission, an association relationship between the PUCCH configuration resource and the bandwidth part for the uplink transmission, and a subcarrier spacing, a cyclic prefix, the number of symbols, and a period of the PUCCH configuration resource.

Optionally, in a case that the computer program is executed by the processor 701, the processor 701 implements a following step: acquiring, through a higher layer signaling or downlink control information (DCI), the indication information sent by the base station.

Optionally, in a case that the computer program is executed by the processor 701, the processor 701 implements a following step: receiving minimum system information sent by the base station, wherein the minimum system information carries PDCCH resource configuration information and PUCCH resource configuration information corresponding to the PDCCH resource configuration information.

Optionally, in a case that the computer program is executed by the processor 701, the processor 701 implements following steps: in a case that the mobile terminal is configured with a PUCCH resource in advance, transmitting the uplink control information according to the PUCCH resource configured in advance; in a case that the mobile terminal is not configured with a PUCCH resource in advance, transmitting the uplink control information according to the PUCCH resource corresponding to the PUCCH resource configuration information carried in the minimum system information.

Optionally, in a case that the computer program is executed by the processor 701, the processor 701 implements a following step: in a contention-based random access procedure, sending a hybrid automatic request retransmission response to the base station in a collision resolution procedure according to the PUCCH resource corresponding to the PUCCH resource configuration information carried in the minimum system information.

Optionally, in a case that the computer program is executed by the processor 701, the processor 701 implements a following step: sending a hybrid automatic request retransmission response at a corresponding position of the PUCCH configuration resource according to the position information indicated by the indication information.

Optionally, the indication information includes at least one of the following: the association relationship between the PDCCH configuration resource and the PUCCH configuration resource, a control channel element index of downlink control information, resource offset indication information carried in the downlink control information, and a starting position of the PUCCH configuration resource.

Optionally, the radio interface resource includes at least two PUCCH configuration resources and at least two PDCCH configuration resources, and the PUCCH configuration resources correspond to the PDCCH configuration resources in one-to-one correspondence manner. Optionally, in a case that the computer program is executed by the processor 701, the processor 701 implements the following steps: sending the hybrid automatic request retransmission response to the base station according to a resource position, corresponding to a control channel element index of first downlink control information (DCI), in a first PUCCH configuration resource; wherein the first DCI is a DCI of a first PDCCH configuration resource, the first PUCCH configuration resource is a PUCCH configuration resource corresponding to the first PDCCH configuration resource, and the first PDCCH configuration resource is any one of at least two PDCCH configuration resources.

Optionally, the radio interface resource includes a PUCCH configuration resource and at least two PDCCH configuration resources, and each of the PDCCH configuration resources corresponds to a PUCCH resource subset in the PUCCH configuration resource. Optionally, in a case that the computer program is executed by the processor 701, the processor 701 implements the following steps: sending a hybrid automatic request retransmission response to the base station according to a resource position, corresponding to a control channel element index of a second DCI, in the first PUCCH resource subset; wherein the second DCI is a DCI of a second PDCCH configuration resource, the first PUCCH resource subset is a PUCCH resource subset corresponding to the second PDCCH configuration resource, the second PDCCH configuration resource is any one of the at least two PDCCH configuration resources.

Optionally, a PDCCH configuration resource included in the radio interface resource carries different pieces of downlink control information (DCI), and control channel element indices of the different pieces of DCI correspond to different PUCCH configuration resources. Optionally, in a case that the computer program is executed by the processor 701, the processor 701 implements the following step: selecting a target DCI, configured for the mobile terminal, in the PDCCH configuration resource, and sending a hybrid automatic request retransmission response to the base station according to a resource position, corresponding to a control channel element index of the target DCI, in a target PUCCH configuration resource, wherein the target PUCCH configuration resource is a PUCCH configuration resource corresponding to the target DCI.

Optionally, a DCI of the PDCCH configuration resource included in the radio interface resource carries resource offset indication information. Optionally, in a case that the computer program is executed by the processor 701, the processor 701 implements the following steps: according to a control channel element index of the DCI of the PDCCH configuration resource and the resource offset indication information carried by the DCI, selecting a PUCCH configuration resource from a plurality of PUCCH configuration resources included in the radio interface resource; and according to a subcarrier spacing, a cyclic prefix, the number of symbols, and a period of the PUCCH configuration resource and a bandwidth part for uplink transmission associated with the PUCCH, selecting a resource position, for sending the hybrid automatic request retransmission response to the base station, in the selected PUCCH configuration resource.

Optionally, the radio interface resource includes one or at least two PDCCH configuration resources and at least two PUCCH configuration resources, and a DCI of each of the one or at least two PDCCH configuration resources carries the resource offset indication information and slot information of the PUCCH configuration resources. Optionally, in a case that the computer program is executed by the processor 701, the processor 701 implements following steps: according to the slot information, the resource offset indication information and periods of the PUCCH resources carried by DCIs of the one or more PDCCH configuration resources, selecting a PUCCH configuration resource in the radio interface resource; and according to a subcarrier spacing, a cyclic prefix, the number of symbols and a period of the PUCCH resource, and a bandwidth part for uplink transmission associated with the PUCCH, selecting a resource position, for sending a hybrid automatic request retransmission response to the base station, in the selected PUCCH configuration resource.

Optionally, the radio interface resource includes one or at least two PDCCH configuration resources and at least two PUCCH configuration resources, and different ones of the PUCCH configuration resources correspond to different bandwidth parts, and a DCI of each of the one or at least two PDCCH configuration resources carries resource offset indication information, slot information of the PUCCH configuration resources, and bandwidth parts corresponding to the PUCCH configuration resources. Optionally, in a case that the computer program is executed by the processor 701, the processor 701 implements the following steps: according to the resource offset indication information, the slot information of the PUCCH configuration resources and the bandwidth parts corresponding to the PUCCH configuration resources carried by the DCI, selecting a PUCCH configuration resource on a BWP; and according to a subcarrier spacing, a cyclic prefix, the number of symbols, and a period of the PUCCH resource and a bandwidth part for uplink transmission associated with the PUCCH, selecting a resource position, for sending a hybrid automatic request retransmission response to the base station, in the selected PUCCH configuration resource.

In the mobile terminal 700 of some embodiments of the present disclosure, the processor 701 acquires indication information and a physical uplink control channel (PUCCH) configuration resource configured for the mobile terminal sent by a base station, and from the indication information, the mobile terminal may be informed of position information, in the PUCCH configuration resource, of a PUCCH resource used by the mobile terminal, and further select, based on the position information, a corresponding PUCCH resource for transmitting uplink control information, thereby increasing a resource utilization rate; and a resource conflict problem in a multi-user space division multiplexing may be addressed.

The mobile terminal of the present disclosure may be, for example, a mobile phone, a tablet computer, a Personal Digital Assistant (PDA), or a vehicle-mounted computer or the like.

The mobile terminal 700 may implement various processes implemented by the terminal in the foregoing embodiments, and in order to avoid repetition, a detailed description thereof is omitted here.

The method disclosed by some embodiments of the present disclosure described above may be applied to, or implemented by, the processor 701. The processor 701 may be an integrated circuit chip with a signal processing capability. In implementation, the steps of the method described above may be accomplished by an integrated logic circuitry of hardware in the processor 701 or instructions in a form of software. The processor 701 described above may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The disclosed methods, steps, and logic blocks in some embodiments of the present disclosure may be implemented or performed. The general purpose processor may be a microprocessor or the processor may be any conventional processor or the like. The steps of the method disclosed in connection with some embodiments of the present disclosure may be implemented directly as being executed by a hardware decoding processor, or as being executed by a combination of hardware and software modules in the decoding processor. A software module may be located in a storage medium mature in the art such as a random access memory, a flash memory, a read only memory, a programmable read only memory, or an electrically erasable programmable memory, a register, etc. The storage medium is located in the storage 702 and the processor 701 reads information in the storage 702 and performs the steps of the method described above in conjunction with hardware of the processor 701.

It may be understood that the embodiments described herein may be implemented in hardware, software, firmware, middleware, microcode, or a combination thereof. For a hardware implementation, a processing unit may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general purpose processor, a controller, a microcontroller, a microprocessor, another electronic unit for performing the functions described herein, or combinations thereof.

For a software implementation, techniques described herein may be implemented by modules (e.g., processes, functions, etc.) that perform the functions described herein.

A software code may be stored in a storage and executed by a processor. The storage may be implemented in the processor or external to the processor.

Figure 8:
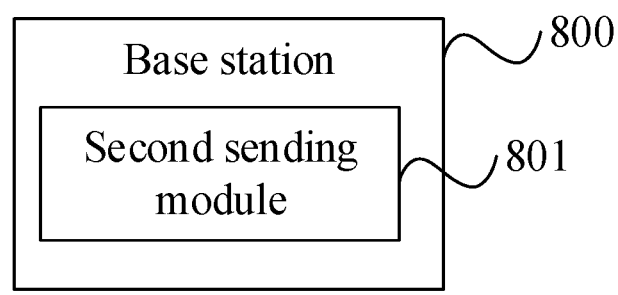
FIG. 8 is a schematic diagram of modules in a base station according to some embodiments of the present disclosure.

As shown in FIG. 8, some embodiments of the present disclosure also provide a base station 800. The base station 800 includes a second sending module 801, configured to send, to a mobile terminal, indication information and a physical uplink control channel (PUCCH) configuration resource configured for the mobile terminal, wherein the indication information is configured to indicate position information, in the PUCCH configuration resource, of a PUCCH resource used by the mobile terminal.

In the base station of some embodiments of the present disclosure, the second sending module 801 is configured to transmit a radio interface resource configured for the mobile terminal to the mobile terminal through a higher layer signaling, wherein the radio interface resource includes the PUCCH configuration resource.

Figure 9:
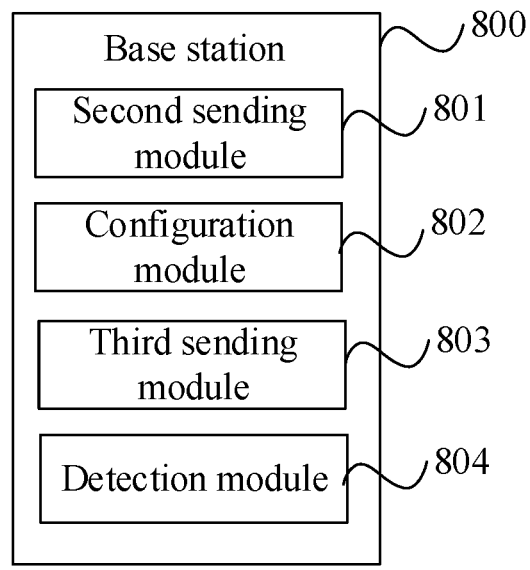
FIG. 9 is another schematic diagram of modules in a base station according to some embodiments of the present disclosure.

As shown in FIG. 9, the base station 800 of some embodiments of the present disclosure further includes a configuration module 802, configured to configure a PDCCH configuration resource and a PUCCH configuration resource in a bandwidth part for the mobile terminal according to information of the mobile terminal, wherein the information of the mobile terminal includes at least one of capability information of the mobile terminal and service transmission information of the mobile terminal.

In the base station of some embodiments of the present disclosure, the radio interface resource further includes at least one physical downlink control channel (PDCCH) configuration resource, an association relationship between the PDCCH configuration resource and the PUCCH configuration resource, a bandwidth part for uplink transmission, a bandwidth part for downlink transmission, an association relationship between the PUCCH resource and the bandwidth part for the uplink transmission, and a subcarrier spacing, a cyclic prefix, the number of symbols, and a period of the PUCCH configuration resource.

In the base station of some embodiments of the present disclosure, the second sending module 801 is configured to send the indication information to the mobile terminal through a higher layer signaling or downlink control information (DCI).

In the base station of some embodiments of the present disclosure, in a case that the indication information is DCI, at least one of resource offset indication information, slot information of a PUCCH configuration resource and a bandwidth part corresponding to a PUCCH resource is carried in the DCI.

The base station 800 of some embodiments of the present disclosure further includes a third sending module 803, configured to send minimum system information to the mobile terminal, wherein the minimum system information carries PDCCH resource configuration information and PUCCH resource configuration information corresponding to the PDCCH resource configuration information.

The base station 800 of some embodiments of the present disclosure further includes a detection module 804, configured to detect, on a PUCCH configuration resource configured in advance, uplink control information transmitted by the mobile terminal, wherein the PUCCH configuration resource configured in advance includes a PUCCH configuration resource configured by the base station for the mobile terminal through a higher layer signaling, or a PUCCH resource corresponding to PUCCH resource configuration information carried by the minimum system information.

It should be noted that the base station in this embodiment is a base station corresponding to the above-described resource indication method applied to a base station side, and all implementations of the above-described embodiments are applicable to the base station embodiment, and the same technical effect may be achieved.

Some embodiments of the present disclosure also provide a base station. The base station includes a storage, a processor, and a computer program stored on the storage and executable by the processor. In a case that the computer program is executed by the processor, the processor implements the steps of the resource indication method applied to the base station side, and the same technical effect may be achieved. In order to avoid repetition, the detailed description thereof is omitted here.

Some embodiments of the present disclosure also provide a computer readable storage medium having a computer program stored thereon. In a case that the computer program is executed by a processor, the processor implements the steps of the resource indication method applied to the base station side, and the same technical effect may be achieved. In order to avoid repetition, the detailed description thereof is omitted here. The computer readable storage medium may be a volatile storage medium or a non-volatile storage medium, such as a Read-Only Memory (ROM), a Random Access Memory (RAM), a magnetic disk, an optical disk, or the like.

Figure 10:
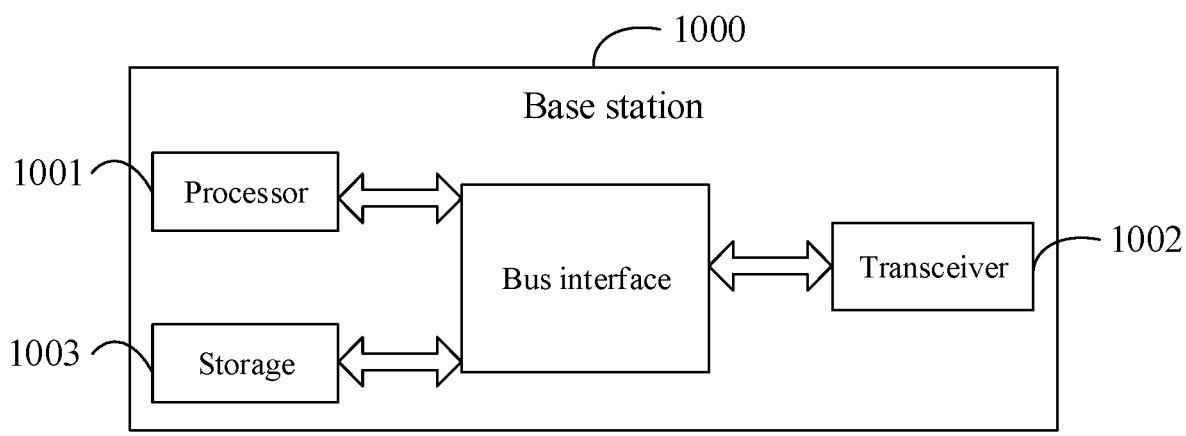
FIG. 10 is a structural block diagram of a base station according to some embodiments of the present disclosure.

As shown in FIG. 10, some embodiments of the present disclosure also provide a base station 1000. The base station 1000 includes a processor 1001, a transceiver 1002, a storage 1003, and a bus interface.

The processor 1001 is configured to read a program in the storage 1003 and perform a following step: sending, to a mobile terminal, indication information and a physical uplink control channel (PUCCH) configuration resource configured for the mobile terminal, wherein the indication information is configured to indicate position information, in the PUCCH configuration resource, of a PUCCH resource used by the mobile terminal.

In FIG. 10, a bus architecture may include any number of interconnected buses and bridges, specifically, link various circuits such as one or more processors represented by the processor 1001 and a storage represented by the storage 1003 together. The bus architecture may also link together a variety of other circuits, such as peripheral devices, regulators, and power management circuits, which are well known in the art and, therefore, will not be described further herein. A bus interface provides an interface. The transceiver 1002 may be a plurality of elements, including a transmitter and a receiver, for providing means for communicating with various other devices over a transmission medium.

The processor 1001 is responsible for managing the bus architecture and general processing, and the storage 1003 may store data used by processor 1001 when performing operations.

Optionally, the processor 1001 is configured to read the program in the storage 1003 to further performing a following step: transmitting a radio interface resource configured for the mobile terminal to the mobile terminal through a higher layer signaling, wherein the radio interface resource includes the PUCCH configuration resource.

Optionally, the processor 1001 is configured to read the program in the storage 1003 to further performing a following step: configuring a PDCCH configuration resource and a PUCCH configuration resource in a bandwidth part for the mobile terminal according to information of the mobile terminal, wherein the information of the mobile terminal includes at least one of capability information of the mobile terminal and service transmission information of the mobile terminal.

Optionally, the radio interface resource further includes at least one physical downlink control channel (PDCCH) configuration resource, an association relationship between the PDCCH configuration resource and the PUCCH configuration resource, a bandwidth part for uplink transmission, a bandwidth part for downlink transmission, an association relationship between the PUCCH resource and the bandwidth part for the uplink transmission, and a subcarrier spacing, a cyclic prefix, the number of symbols, and a period of the PUCCH configuration resource.

Optionally, the processor 1001 is configured to read the program in the storage 1003 to further performing a following step: sending the indication information to the mobile terminal through a higher layer signaling or downlink control information (DCI).

Optionally, in a case that the indication information is DCI, at least one of resource offset indication information, slot information of a PUCCH configuration resource and a bandwidth part corresponding to a PUCCH resource is carried in the DCI.

Optionally, the processor 1001 is configured to read the program in the storage 1003 to further performing a following step: sending minimum system information to the mobile terminal, wherein the minimum system information carries PDCCH resource configuration information and PUCCH resource configuration information corresponding to the PDCCH resource configuration information.

Optionally, the processor 1001 is configured to read the program in the storage 1003 to further performing a following step: detecting, on a PUCCH configuration resource configured in advance, uplink control information transmitted by the mobile terminal, wherein the PUCCH configuration resource configured in advance includes a PUCCH configuration resource configured by the base station for the mobile terminal through a higher layer signaling, or a PUCCH resource corresponding to PUCCH resource configuration information carried by the minimum system information.

The base station of some embodiments of the present disclosure optimizes an allocation scheme of PUCCH resources in a large bandwidth scene, improves resource utilization, supports response feedbacks of multiple PDCCHs, and solves a resource conflict problem in the multi-user space division multiplexing.

Various embodiments in this specification are described in a progressive manner, and each of the embodiments focuses on differences from the other embodiments, and the same and similar parts between the various embodiments may be obtained by referring to each other.

Those skilled in the art will appreciate that some embodiments of the present disclosure may be provided as methods, apparatuses, or computer program products. Accordingly, some embodiments of the present disclosure may take forms of full hardware embodiments, full software embodiments, or embodiments that combine software and hardware aspects. Some embodiments of the present disclosure may take a form of a computer program product implemented on one or more computer-usable storage media (including, but not limited to, a magnetic disk storage, a CD-ROM, an optical storage, etc.) including a computer-usable program code.

Some embodiments of the present disclosure are described with reference to flow charts and/or block diagrams of methods, terminal devices (systems), and computer program products according to some embodiments of the present disclosure. It should be understood that each flow and/or block in a flowchart and/or a block diagram, and a combination of a flow and/or a block in the flowchart and/or the block diagram, may be implemented by computer program instructions. These computer program instructions may be provided to a processor of a general purpose computer, a special purpose computer, an embedded processor, or another programmable data processing terminal device to produce a machine, so that a device for implementing functions specified in one or more flows in the flow charts and/or one or more blocks in the block diagrams are generated through execution of the instructions by a processor of a computer or another programmable data processing terminal device.

These computer program instructions may be stored in a computer readable storage capable of guiding a computer or another programmable data processing terminal device to operate in a specific sequence, so that a device including an instruction module for implementing functions specified in one or more flows in the flow charts and/or one or more blocks in the block diagrams is generated by instructions stored in the computer readable storage.

These computer program instructions may be loaded onto a computer or another programmable data processing terminal device, so that a series of operations and steps is executed on the computer and the programmable terminal device, so that an instruction executed on the computer and the programmable terminal device implements steps for implementing functions specified in one or more flows in the flow charts and/or one or more blocks in the block diagram.

Although optional embodiments of some embodiments of the present disclosure have been described, additional changes and modifications may be made to these embodiments once those skilled in the art have learned basic inventive concepts. Therefore, the appended claims are intended to be construed as including optional embodiments and all modifications and changes falling within the scope of some embodiments of the present disclosure.

It should also be noted that in the present disclosure, relational terms such as first and second, etc. are used only to distinguish one entity or operation from another entity or operation, without necessarily requiring existence of any such actual relationship or order among these entities or operations. Moreover, the term "comprising," "including," or any other variant thereof is intended to cover a non-exclusive inclusion such that processes, methods, articles or terminal devices including a series of elements include not only those elements, but also include other elements that are not explicitly listed, or that are inherent to such processes, methods, articles, or terminal devices. An element after a statement "including one . . . ", if without a further limitation, do not exclude presence of further identical elements in a process, a method, an article or a terminal device including the element.

What has been described above are optional embodiments of the present disclosure. It should be noted that several improvements and refinements may be made by those of ordinary skills in the art without departing from the principles described herein. These improvements and refinements are also within the scope of the present disclosure.

What is claimed is:

1. A resource indication method, applied to a mobile terminal and comprising:
acquiring indication information and a physical uplink control channel (PUCCH) configuration resource configured for the mobile terminal sent by a base station, wherein the indication information is configured to indicate position information, in the PUCCH configuration resource, of a PUCCH resource used by the mobile terminal;

receiving minimum system information sent by the base station, wherein the minimum system information carries physical downlink control channel (PDCCH) resource configuration information and PUCCH resource configuration information corresponding to the PDCCH resource configuration information, wherein after receiving the minimum system information sent by the base station, the method further comprises:

in a case that the mobile terminal is configured with a PUCCH resource in advance, transmitting uplink control information according to the PUCCH resource configured in advance; and in a case that the mobile terminal is not configured with a PUCCH resource in advance, transmitting uplink control information according to a PUCCH resource corresponding to the PUCCH resource configuration information carried in the minimum system information.

2. The resource indication method according to claim 1, wherein acquiring the indication information and the PUCCH configuration resource configured for the mobile terminal sent by the base station, comprises:

acquiring, through a higher layer signaling, the PUCCH configuration resource in a radio interface resource configured by the base station for the mobile terminal.

3. The resource indication method according to claim 2, wherein the radio interface resource further comprises at least one physical downlink control channel (PDCCH) configuration resource, an association relationship between the PDCCH configuration resource and the PUCCH configuration resource, a bandwidth part for uplink transmission, a bandwidth part for downlink transmission, an association relationship between the PUCCH configuration resource and the bandwidth part for the uplink transmission, and a subcarrier spacing, a cyclic prefix, the number of symbols, and a period of the PUCCH configuration resource.

4. The resource indication method according to claim 2, wherein, after acquiring the indication information and the PUCCH configuration resource configured for the mobile terminal sent by the base station, the method further comprises:

sending a hybrid automatic request retransmission response at a corresponding position of the PUCCH configuration resource according to the position information indicated by the indication information.

5. The resource indication method according to claim 4, wherein the indication information comprises at least one of:

an association relationship between a physical downlink control channel (PDCCH) configuration resource and a PUCCH configuration resource, a control channel element index of downlink control information, resource offset indication information carried in the downlink control information, and a starting position of the PUCCH configuration resource.

6. The resource indication method according to claim 5, wherein, the radio interface resource comprises at least two PUCCH configuration resources and at least two PDCCH configuration resources, and the PUCCH configuration resources correspond to the PDCCH configuration resources in one-to-one correspondence manner;

sending the hybrid automatic request retransmission response at the corresponding position of the PUCCH configuration resource according to the position information indicated by the indication information, comprises: sending the hybrid automatic request retransmission response to the base station according to a resource position, corresponding to a control channel element index of first downlink control information (DCI), in a first PUCCH configuration resource;

wherein the first DCI is a DCI of a first PDCCH configuration resource, the first PUCCH configuration resource is a PUCCH configuration resource corresponding to the first PDCCH configuration resource, and the first PDCCH configuration resource is any one of the at least two PDCCH configuration resources;

or, the radio interface resource comprises a PUCCH configuration resource and at least two PDCCH configuration resources, and each of the PDCCH configuration resources corresponds to a PUCCH resource subset in the PUCCH configuration resource;

sending the hybrid automatic request retransmission response at the corresponding position of the PUCCH configuration resource according to the position information indicated by the indication information, comprises: sending the hybrid automatic request retransmission response to the base station according to a resource position, corresponding to a control channel element index of a second DCI, in the first PUCCH resource subset;

wherein the second DCI is a DCI of a second PDCCH configuration resource, the first PUCCH resource subset is a PUCCH resource subset corresponding to the second PDCCH configuration resource, the second PDCCH configuration resource is any one of the at least two PDCCH configuration resources;

or,

PDCCH configuration resources comprised in the radio interface resource carries different pieces of downlink control information (DCI), and control channel element indices of the different pieces of DCI correspond to different PUCCH configuration resources;

sending the hybrid automatic request retransmission response at the corresponding position of the PUCCH configuration resource according to the position information indicated by the indication information comprises: selecting a target DCI, configured for the mobile terminal, in the PDCCH configuration resource, and sending the hybrid automatic request retransmission response to the base station according to a resource position, corresponding to a control channel element index of the target DCI, in a target PUCCH configuration resource, wherein the target PUCCH configuration resource is a PUCCH configuration resource corresponding to the target DCI;

or, a DCI of the PDCCH configuration resource comprised in the radio interface resource carries resource offset indication information;

sending the hybrid automatic request retransmission response at the corresponding position of the PUCCH configuration resource according to the position information indicated by the indication information comprises: according to a control channel element index of the DCI of the PDCCH configuration resource and the resource offset indication information carried by the DCI, selecting a PUCCH configuration resource from a plurality of PUCCH configuration resources comprised in the radio interface resource; and according to a subcarrier spacing, a cyclic prefix, the number of symbols, and a period of the PUCCH configuration resource and a bandwidth part for uplink transmission associated with a PUCCH, selecting a resource position, for sending the hybrid automatic request retransmission response to the base station, in the selected PUCCH configuration resource;

or, the radio interface resource comprises one or at least two PDCCH configuration resources and at least two PUCCH configuration resources, and a DCI of each of the one or at least two PDCCH configuration resources carries resource offset indication information and slot information of the PUCCH configuration resources;

sending the hybrid automatic request retransmission response at the corresponding position of the PUCCH configuration resource according to the position information indicated by the indication information comprises: according to the slot information, the resource offset indication information and periods of the PUCCH resources carried by the DCI of the PDCCH configuration resource, selecting a PUCCH configuration resource in the radio interface resource; and according to a subcarrier spacing, a cyclic prefix, the number of symbols and a period of the PUCCH resource, and a bandwidth part for uplink transmission associated with the PUCCH, selecting a resource position, for sending a hybrid automatic request retransmission response to the base station, in the selected PUCCH configuration resource;

or, the radio interface resource comprises one or at least two PDCCH configuration resources and at least two PUCCH configuration resources, and different ones of the PUCCH configuration resources correspond to different bandwidth parts, and a DCI of each of the one or at least two PDCCH configuration resources carries resource offset indication information, slot information of the PUCCH configuration resources, and bandwidth parts corresponding to the PUCCH configuration resources;

sending the hybrid automatic request retransmission response at the corresponding position of the PUCCH configuration resource according to the position information indicated by the indication information comprises: according to the resource offset indication information, the slot information of the PUCCH configuration resources and the bandwidth parts corresponding to the PUCCH configuration resources carried by the DCI, selecting a PUCCH configuration resource on a BWP; and according to a subcarrier spacing, a cyclic prefix, the number of symbols, and a period of the PUCCH resource and a bandwidth part for uplink transmission associated with the PUCCH, selecting a resource position, for sending the hybrid automatic request retransmission response to the base station, in the selected PUCCH configuration resource.

7. The resource indication method according to claim 1, wherein acquiring the indication information sent by the base station, comprises:
acquiring, through a higher layer signaling or downlink control information (DCI), the indication information sent by the base station.

8. The resource indication method according to claim 1, wherein in a case that the mobile terminal is not configured with the PUCCH resource in advance, transmitting the uplink control information according to the PUCCH resource corresponding to the PUCCH resource configuration information carried in the minimum system information, comprises:
in a contention-based random access procedure, sending a hybrid automatic request retransmission response to the base station in a collision resolution procedure according to the PUCCH resource corresponding to the PUCCH resource configuration information carried in the minimum system information.

9. A mobile terminal comprising:
a storage, a processor, and a computer program stored on the storage and executable by the processor, wherein in a case that the computer program is executed by the processor, the processor implements steps of the resource indication method according to claim 1.

10. A resource indication method, applied to a base station and comprising:
sending, to a mobile terminal, indication information and a physical uplink control channel (PUCCH) configuration resource configured for the mobile terminal, wherein the indication information is configured to indicate position information, in the PUCCH configuration resource, of a PUCCH resource used by the mobile terminal;
sending minimum system information to the mobile terminal, wherein the minimum system information carries physical downlink control channel (PDCCH) resource configuration information and PUCCH resource configuration information corresponding to the PDCCH resource configuration information,
wherein, after sending to the mobile terminal, the indication information and the PUCCH configuration resource configured for the mobile terminal, the resource indication method further comprises:
detecting, on a PUCCH configuration resource configured in advance, uplink control information transmitted by the mobile terminal,
wherein the PUCCH configuration resource configured in advance comprises a PUCCH configuration resource configured by the base station for the mobile terminal through a higher layer signaling, or a PUCCH resource corresponding to PUCCH resource configuration information carried by the minimum system information.

11. The resource indication method according to claim 10, wherein sending, to the mobile terminal, the indication information and the PUCCH configuration resource configured for the mobile terminal, comprises:
transmitting the radio interface resource configured for the mobile terminal to the mobile terminal through a higher layer signaling,
wherein the radio interface resource comprises the PUCCH configuration resource.

12. The resource indication method according to claim 11, wherein the radio interface resource is acquired by a following step:
configuring a physical downlink control channel (PDCCH) configuration resource and a PUCCH configuration resource in a bandwidth part for the mobile terminal according to information of the mobile terminal,
wherein the information of the mobile terminal comprises at least one of capability information of the mobile terminal and service transmission information of the mobile terminal.

13. The resource indication method according to claim 11, wherein the radio interface resource further comprises at least one physical downlink control channel (PDCCH) configuration resource, an association relationship between the PDCCH configuration resource and the PUCCH configuration resource, a bandwidth part for uplink transmission, a bandwidth part for downlink transmission, an association relationship between the PUCCH resource and the bandwidth part for the uplink transmission, and a subcarrier spacing, a cyclic prefix, the number of symbols, and a period of the PUCCH configuration resource.

14. The resource indication method according to claim 10, wherein sending, to the mobile terminal, the indication information and the PUCCH configuration resource configured for the mobile terminal, comprises:
   sending the indication information to the mobile terminal through a higher layer signaling or downlink control information (DCI).

15. The resource indication method according to claim 14, wherein in a case that the indication information is DCI, at least one of resource offset indication information, slot information of a PUCCH configuration resource and a bandwidth part corresponding to a PUCCH resource is carried in the DCI.

16. A base station, comprising:
   a storage, a processor, and a computer program stored on the storage and executable by the processor, wherein in a case that the computer program is executed by the processor, the processor implements steps of the resource indication method according to claim 10.

* * * * *